United States Patent
Matthews et al.

(10) Patent No.: US 7,789,550 B2
(45) Date of Patent: Sep. 7, 2010

(54) METHOD OF COMBINING MATERIALS

(75) Inventors: Siobhan Olive Matthews, Drogheda (IE); John Matthews, Drogheda (IE)

(73) Assignee: SCF Processing Ltd., Drogheda (IE)

( * ) Notice: Subject to any disclaimer, the term of this patent is extended or adjusted under 35 U.S.C. 154(b) by 802 days.

(21) Appl. No.: 10/527,463

(22) PCT Filed: Sep. 12, 2003

(86) PCT No.: PCT/GB03/03964

§ 371 (c)(1), (2), (4) Date: Aug. 24, 2005

(87) PCT Pub. No.: WO2004/024802

PCT Pub. Date: Mar. 25, 2004

(65) Prior Publication Data
US 2005/0279707 A1 Dec. 22, 2005

(30) Foreign Application Priority Data
Sep. 12, 2002 (GB) .................................. 0221150.6

(51) Int. Cl.
*B01F 13/00* (2006.01)
(52) U.S. Cl. ...................... 366/101; 210/634; 264/45.9; 264/50; 264/51; 264/85; 264/101; 264/211; 264/328.1; 366/76.6; 366/107; 366/348; 523/340
(58) Field of Classification Search ................. 210/188, 210/511, 634, 639, 806; 366/131, 150.1, 366/147, 167.1, 172.1, 75, 76.6, 101, 102, 366/107, 348; 264/5, 11–13, 40.6, 70, 45.9, 264/50–55, 82, 83, 85, 101, 102, 211, 328.1, 264/344; 427/212, 222; 523/340–353
See application file for complete search history.

(56) References Cited

U.S. PATENT DOCUMENTS 5,108,799 A * 4/1992 Hoy et al. .................... 427/422
5,308,648 A * 5/1994 Prince et al. ................. 427/212

(Continued)

FOREIGN PATENT DOCUMENTS

EP 0 370 268 A2 5/1990

(Continued)

OTHER PUBLICATIONS

Cooper, A.I., "Polymer synthesis and processing using supercritical carbon dioxide", *J. Mater. Chem*, vol. 10, pp. 207-234, (2000).

(Continued)

*Primary Examiner*—Joseph W Drodge
(74) *Attorney, Agent, or Firm*—The Nath Law Group; Joshua B. Goldberg; Robert M. Joynes

(57) ABSTRACT

A method for combining materials (such as impregnating materials with functional materials) uses a combination of supercritical fluid technology and polymer melt processing technology. The functional material is soluble in a near supercritical or supercritical fluid, which dissolves in the matrix/bulk material during melt processing. Controlling the processing conditions facilitates a change of state for the fluid, which results in the precipitation of the functional material in the bulk material. The impregnated bulk material may be shaped using conventional polymer based processing techniques such as extrusion and injection moulding.

18 Claims, 4 Drawing Sheets

U.S. PATENT DOCUMENTS

| | | | |
|---|---|---|---|
| 5,508,060 A | | 4/1996 | Perman et al. |
| 5,816,700 A | * | 10/1998 | Starke et al. ............... 366/147 |
| 5,922,833 A | * | 7/1999 | DeSimone ................ 528/490 |
| 6,051,174 A | | 4/2000 | Park et al. |
| 6,114,414 A | * | 9/2000 | Daly et al. ................ 523/330 |
| 6,340,722 B1 | * | 1/2002 | Lee et al. .................... 524/428 |
| 6,828,363 B2 | * | 12/2004 | Beuermann et al. ........... 524/81 |

FOREIGN PATENT DOCUMENTS

| | | |
|---|---|---|
| EP | 0 590 647 A1 | 4/1994 |
| WO | 93/06731 A1 | 4/1993 |
| WO | 94/09913 A1 | 5/1994 |
| WO | 96/00610 A1 | 1/1996 |
| WO | 01/97584 A2 | 12/2001 |
| WO | 02/47893 A1 | 6/2002 |
| WO | 03/040219 A1 | 5/2003 |

OTHER PUBLICATIONS

Kazarian, S.G., "Polymer Processing with Supercritical Fluids", *Polymer Science*, Series C, vol. 42, No. 1, pp. 78-101, (2000).

Cooper, A., "Clean polymer synthesis and processing using $scCO_2$", *Green Chemistry*, pp. G167-G168, (Dec. 1999).a.

* cited by examiner

METHOD OF COMBINING MATERIALS

The present invention relates in general to a method for combining a first material and a second material and in particular to a method for incorporating functional materials into bulk material systems.

A functional material is a material that has the ability to perform a specific function or a number of functions. By incorporating a functional material into a bulk material the resultant material system can have the ability to undertake the specific function or functions without adversely affecting the original properties of the bulk material. Therefore, bulk materials, both inorganic and organic such as polymers, ceramics, metals and wood, can be processed in such a way that functional materials can be incorporated into the matrix.

Functional materials could for example impart useful properties to the bulk material such as the ability to transmit and/or receive electrical, microwave and radio wave signals. Other functions which could be imparted include the ability to absorb and/or transmit energy from the electromagnetic spectrum, sound energy, an electrical charge or heat. In addition, mechanical properties such as impact resistance and burst strength could be enhanced. After mixing and shaping the bulk material could act as a chemical or biological sensor.

Conventional polymer based melt processing facilitates the incorporation of materials such as fillers into a matrix material at a macroscopic level.

Methods employed include
(i) dry mixing of the filler and the matrix material prior to melt processing
  Step 1: weigh materials
  Step 2: place weighed materials in blender (eg V-blender) for dry mixing
  Step 3: place dry blend in polymer melt processing equipment for melt mixing, shaping in die or mould section and then solidification.
A schematic of type (i) conventional processing is provided in FIG. 1;
(ii) adding the filler to the polymer melt (matrix) during compounding (form of extrusion)
  Step 1: weigh materials
  Step 2: place weighed matrix/bulk materials in polymer melt processing equipment
  Step 3: add filler/functional material downstream via feed port in barrel of extruder or injection moulder for melt mixing, shaping in die or mould section and then solidification.
A schematic of type (ii) conventional processing is provided in FIG. 2.

Conventional techniques include melt, mix, blend and shaping, extrusion, injection moulding, blow moulding, vacuum forming or thermoforming, multi layer extrusion, multi shot injection moulding, rotational moulding and blown film extrusion.

In conventional polymer-based melt processing, fillers might be chosen to enhance the mechanical properties of the matrix material, to reduce material cost or to provide aesthetic qualities. However, these fillers might affect the aesthetic properties or the anisotropy of the matrix material or the material system. Also if the distribution is not efficient the function of the filler might not be effective.

To date the incorporation of functional materials into bulk systems using conventional polymer melt processing techniques other than for mechanical enhancement, to reduce material cost or to provide aesthetic qualities is rare.

It is well known that supercritical fluids such as supercritical carbon dioxide can behave as tuneable solvents and provide a clean and efficient method for the extraction of components from bulk materials such as soil remediation and the decaffeination of coffee (as disclosed in U.S. Pat. No. 3,806,619).

Supercritical fluids can also be used in the processing of materials as disclosed in WO 02/47893 (Brunel University). This method employs a supercritical or near-supercritical fluid for the processing of polymer formulations without induced foaming, resulting in the benefits of reduced melt viscosity and/or lower melt temperatures.

A number of techniques have been developed whereby a supercritical fluid is employed to swell a polymer matrix and to impregnate the matrix with a specific material. Supercritical fluids have been used for example to dye batch materials in their solid state. When the conditions are altered so that the fluid becomes gaseous it leaves the solid polymer leaving the dye within the swelled polymer cavity. A good review of such methods can be found in Kazarian "Polymer Processing with Supercritical Fluids" *Polymer Science, Ser. C, Vol. 42, No. 1*, 2000, pp. 78-101. Another review is given by Cooper in "Polymer synthesis and processing using supercritical carbon dioxide" *J. Mater. Chem.*, 2000, 10, 207-234.

U.S. Pat. No. 5,508,060 (Minnesota Mining and Manufacturing Company) describes a method for impregnating various polymer substrates with an impregnation additive by simultaneously contacting the polymer substrate with a supercritical fluid, an impregnation additive (which is substantially insoluble in the supercritical fluid) and a carrier liquid.

U.S. Pat. No. 6,051,174 (Massachusetts Institute of Technology) discloses the use of a supercritical fluid as a blowing agent in polymer melt processing to form microcellular foamed components. During processing the blowing agent dissolves into the bulk material to form a single phase. However, no functional materials are introduced into the polymer.

No bulk polymer-based material processing technique (for example extrusion or injection moulding) enabling the addition of materials at a nanoscale or near nanoscale level has been reported.

The present invention seeks to provide an improved method and system for incorporating functional materials into bulk materials. It uses conventional polymer processing techniques allied with unique and novel processing to allow products with functional applications having complex geometries and no size restrictions to be manufactured on a commercial scale. The invention provides a clean, efficient and environmentally friendly method for the incorporation of functional materials.

According to a first aspect of the present invention, there is provided a method for combining a first material and a second material, comprising the steps of providing a fluid which is near or in the supercritical fluid state, forming a single phase solution from the first material, the second material and said fluid, and removing said fluid from said solution in order to leave the combined first and second materials.

The first material may be at least partially dissolved in said fluid before the second material or vice versa. Alternatively, the first material may be dissolved in said fluid and then the resulting solution dissolved in the second material, if the second material is in a molten or semi-solid state. It will be appreciated that it is not always clear on a molecular level which component is dissolving in which; the important thing however is that a single phase solution of the three components is formed.

The first material is preferably a functional material, that is a material which alters the function of the second material. Examples of functional materials include minerals, vitamins, fullerenes, metals, non-metals, herbs, naturally occurring materials, caffeine, organic materials, plastics materials, monomers, oligomers, polymers, or any combination thereof.

Functional materials can be used for micro-devices, data storage, light emitting diodes, photovoltaic cells, fuel cells, batteries and tissue engineering applications. It is possible to enhance the electrical, optical, magnetic, mechanical, energy transfer and chemical sensory properties of bulk materials using this new technology. The teachings herein enable conventional processing equipment to shape complex functional parts and improve on the present small batch scale production limitations.

Particularly preferred uses of the present invention include:
1. The incorporation of food additives such as vitamins and minerals into foodstuffs.
2. The incorporation of herbs, minerals and vitamins into personal hygiene products such as cosmetics, shampoos, conditioners, creams and lotions.
3. The incorporation of a conductive material into the body of a mobile telephone to form an antenna.
4. The incorporation of a radio-frequency transmitter into a helmet for tracking military personnel.
5. Forming an LCD display in a helmet visor.
6. Toughening structures such as glass, concrete and ceramics by incorporating strengthening materials such as buckminsterfullerene.
7. Incorporating dyes and/or fluorescent materials in buildings, aircraft, automobiles, protective clothing, footwear, and protective headwear such as crash helmets, that allow visual warning if an impact has exceeded a predetermined limit and therefore the structural integrity of the component has been compromised.
8. Incorporating functional materials such as nanoclays in petroleum containers to restrict or retard the leakage of vapours from the containers.
9. Toughening protective clothing such as stab proof vests and bullet proof vests by incorporating energy absorbing materials and strengthening materials such as nanoclays and other nanomaterials.
10. Incorporating materials such as lead that block the transmission of energy, such as sound, electrical and thermal energy from buildings, structures and clothing.
11. Incorporating conductive materials such as copper in flexible materials to reduce the size and improve the design of solar panels.
12. Incorporating silicon materials in polymer materials so that flexible silicon chips can be manufactured.
13. Improving bone graft growth by incorporating growth active materials such as phosphorous throughout the temporary bone scaffold.
14. Improving the extraction efficiency of polymer based binder formulations and allowing the formation of open porous structures on-demand from metal and ceramic shaped components (green state) by incorporating surfactants in the formulation during shaping prior to debinding by supercritical fluid extraction and sintering.
15. Improving the flame retardant properties of polymers and textiles by incorporating flame retardant materials such as magnesium hydroxide throughout the body of the component.

According to a further aspect of the present invention, there is provided a method of incorporating into a bulk material a functional material, including the steps of dissolving at least one functional material, in part or in full, in a fluid, which fluid is near or in the supercritical fluid state, and adding the solution of functional material into a bulk material provided in a semi-solid or molten state.

This can be achieved by a variety of methods. The supercritical fluid or near supercritical fluid acts as a solvent and may include the use of entrainers, co-solvents, ligands, and other binding agents such as enzymes and receptors. This method may also include the step of maintaining the system above a predetermined temperature or pressure and the use of more than one supercritical fluid.

The usual definition that is given of a supercritical fluid is a substance where the conditions are such that the temperature and pressure of the substance are both above the critical values. The liquid phase and the gaseous phase are in equilibrium and the transition between them is continuous. However, as is pointed out in the Cooper article referred to above, this definition gives no information about the density of the substance. Cooper therefore quotes a more accurate definition by Darr and Poliakoff, in which a supercritical fluid is described as "any substance, the temperature and pressure of which are higher than their critical values, and which has a density close to or higher than its critical density".

As is explained by Cooper, many applications of supercritical fluids (SCFs), particularly carbon dioxide, require conditions of temperature and pressure such that the density exceeds the critical density, so that the SCF may have properties intermediate between a liquid and a gas. To quote from Cooper:

"When a liquid is heated above its critical temperature at pressures in excess of the critical pressure the transition from liquid to supercritical fluid is continuous . . . unlike the discontinuous transition from liquid to gas when a substance boils at pressures below $P_c$. Hence, under the appropriate conditions (i.e., slightly below the critical temperature and pressure), liquid $CO_2$ may be considered as a "near-critical" fluid. This means that, while being a liquid, the substance may exhibit some SCF-like properties such as reduced viscosity and density. As a consequence, near-critical liquid $CO_2$ displays a limited degree of compressibility and its solvent properties may be fine-tuned with pressure, albeit to a much lesser extent than in the supercritical state. A practical advantage of working with liquid $CO_2$ is that relatively high solvent densities can be achieved at moderate pressures: for example, the density of liquid $CO_2$ at 20° C. is greater than 0.84 g cm$^{-3}$ at pressures above 75 bar. For certain processes that operate near the critical temperature for $CO_2$ (31.1° C.) one may be able to choose between working with $CO_2$ in the liquid state or under supercritical conditions. In such cases the best choice will be determined by the specific process requirements."

Thus the present invention encompasses the use of fluids in the near-supercritical state as well as in the supercritical state.

In practice, those skilled in the art will be able to judge when the fluid is in the appropriate state by the conventional viewing of the cloud point. This technique utilises a pressure vessel with viewing windows in which a fluid can be subjected to temperature and pressure variation to induce the supercritical or near-supercritical state. Prior to achieving the supercritical fluid state when the transition between liquid and gas becomes continuous the contents of the vessel are viewed as cloudy.

A list of SCFs which are suitable for use in the present invention is provided in Table 1 below, which is taken from the Cooper reference. In the Table, $T_c$=critical temperature, $P_c$=critical pressure and $\rho_c$=critical density (the density at the critical temperature and pressure).

TABLE 1

| Substance | $T_c/°C$ | $P_c$/bar | $\rho_c$/g cm$^{-3}$ |
|---|---|---|---|
| $CH_4$ | −82.5 | 46.4 | 0.16 |
| $C_2H_4$ | 10.0 | 51.2 | 0.22 |
| $C_2F_6$ | 19.9 | 30.6 | 0.62 |
| $CHF_3$ | 26.2 | 48.5 | 0.62 |
| $CClF_3$ | 28.9 | 38.6 | 0.58 |
| $CO_2$ | 31.1 | 73.8 | 0.47 |
| $C_2H_6$ | 32.4 | 48.8 | 0.20 |
| $SF_6$ | 45.6 | 37.2 | 0.73 |
| Propylene | 91.9 | 46.1 | 0.24 |
| Propane | 97.2 | 42.5 | 0.22 |
| $NH_3$ | 132.5 | 112.8 | 0.24 |
| Pentane | 187.1 | 33.7 | 0.23 |
| $^i$PrOH | 235.4 | 47.6 | 0.27 |
| MeOH | 240.6 | 79.9 | 0.27 |
| EtOH | 243.5 | 63.8 | 0.28 |
| $^i$BuOH | 275.1 | 43.0 | 0.27 |
| Benzene | 289.0 | 48.9 | 0.30 |
| Pyridine | 347.1 | 56.3 | 0.31 |
| $H_2O$ | 374.2 | 220.5 | 0.32 |

As Kazarian points out, the definition of a supercritical state only applies to a pure substance, as do the figures in Table 1 above. If for example a co-solvent is added to a fluid then this can reduce the pressure at which the fluid becomes supercritical. Any suitable co-solvents may be employed, and these include (but are not limited to) methanol, ethanol, propanol, propylene carbonate, butyl alcohol, propylene carbonate, toluene, pentane, acetylacetone, octane, acetone or any combination thereof. The proportion of co-solvent to said fluid may be as low as 1:100 and is preferably about 1:20, although if necessary the proportion can rise to 1:1.

The preferred embodiment adds sufficient fluid in the near or supercritical state to allow the dissolution of the functional material in the fluid. The preferred embodiment includes means to control the amount of functional fluid/solution that is incorporated into the bulk molten or semi-solid material.

Thus, in the preferred embodiment, functional materials can be dissolved into supercritical and near supercritical fluids and the "mixture" then formed is then incorporated into the bulk material during processing. A typical process would involve a polymer melt processing technique such as injection moulding or extrusion, blow moulding, vacuum forming or thermoforming, multi layer extrusion, multi shot injection moulding, rotational moulding, blown film extrusion where the bulk material is melt mixed and then shaped before solidification. Examples of supercritical fluid assisted processing, without the impregnation of functional materials, are described in WO 02/47893, the contents of which are incorporated herein by reference. During processing the functional material solution dissolves into the bulk material. Altering the solution conditions such as temperature and pressure facilitates precipitation of the functional material from the solution.

In a preferred embodiment the supercritical fluid is injected into a first vessel to contact the functional material and form a functional fluid. The functional fluid is then injected into polymer melt processing equipment where it is combined with the bulk material to form a single phase solution. This could be done manually, but for product consistency it is preferably to control each operation accurately and be co-ordinated or synchronised with the polymer melt process.

Accordingly, gravimetric or volumetric hopper feeders may be used to control the delivery of the bulk material to the processing machine. These feeders are linked to the process control unit of processing machine and therefore can precisely feed the bulk material.

Electronic actuators that are linked to the processing machine, the syringe pumps, pressure transducers and temperature probes in the pressure vessels control the opening and closing of the valves which ultimately feed the functional solution into the processing machine. This allows the precise quantity of functional solution to be injected into the polymer processing equipment.

A specially designed one-way valve allows the injection of the functional solution into the polymer processing machine and avoids blockages occurring at the injection point. An electronic actuator operates this valve.

During an injection moulding type process the injection of the functional solution is synchronised with the plasticizing step These are indications of how to achieve precise control and metering of the functional solution. A person skilled in the art could provide improvements to this process. For example as with all polymer processing operations/techniques each process should be optimised and is subject to a variety of variables such as the material(s) to be processed and the processing conditions. In the case of extrusion based techniques material feed rate, barrel temperature, screw profile(s), screw lengths, shear rate, die design, die temperature and die pressure. The variables for injection moulding based techniques include barrel temperature, screw profile(s), plasticizing duration, changeover point from dosing to injection, injection pressure, injection speed, shot size, cushion size, holding pressure, holding time, back pressure, moulding design, mould clamping force, mould clamping time and pressure levels in the mould.

Variables that are specific to supercritical fluid-assisted polymer processing include but are not limited to the bulk/matrix material, the functional material and its solubility in the supercritical fluid(s), the formation of a single phase solution, the dose rate of the bulk and functional materials, the injection point of the functional solution, the processing temperatures, processing pressures such as in the barrel, mould and die, the shear rate and the shear stress developed during the manufacturing process.

The supercritical or near supercritical fluid can be recycled and used again or can be vented to atmosphere.

In a particularly preferred embodiment the second material is not swollen by the supercritical fluid, and is preferably not swollen at all during the method.

One suitable fluid is carbon dioxide but the invention is not limited to this fluid. Other fluids such as water and nitrogen could be used or any of the fluids listed in Table 1 above, either alone or in combination.

According to another aspect of the present invention, there is provided apparatus for incorporating into a bulk material a functional material, including means for providing at least one functional material, means operable to provide a fluid at a supercritical or near supercritical state, means for dissolving, in part or in full, said at least one functional material in said fluid, and means operable to add the solution of functional material into a bulk material provided in a semi-solid or molten state.

The preferred embodiment uses provides a processing technique which can be incorporated into conventional processes, for example polymer-based processing such as extrusion and injection moulding, to manufacture products with functional applications. The preferred embodiments can provide a clean, efficient and environmentally friendly method for the incorporation of functional materials of the types outlined above and other functional materials which can impart useful properties to the matrix material, such as to transmit and/or receive electrical, microwave and radio wave signals. The absorption and/or the transmission of energy from the electromagnetic spectrum, sound energy, an electrical charge and heat or the bulk material to act as a chemical or biological sensor can also be accomplished using the techniques disclosed herein, as they can provide a new method for the incorporation of functional materials into the bulk material system.

A number of preferred embodiments of the present invention are described below, by way of example only, with reference to the accompanying drawings, in which.

Figure 1:
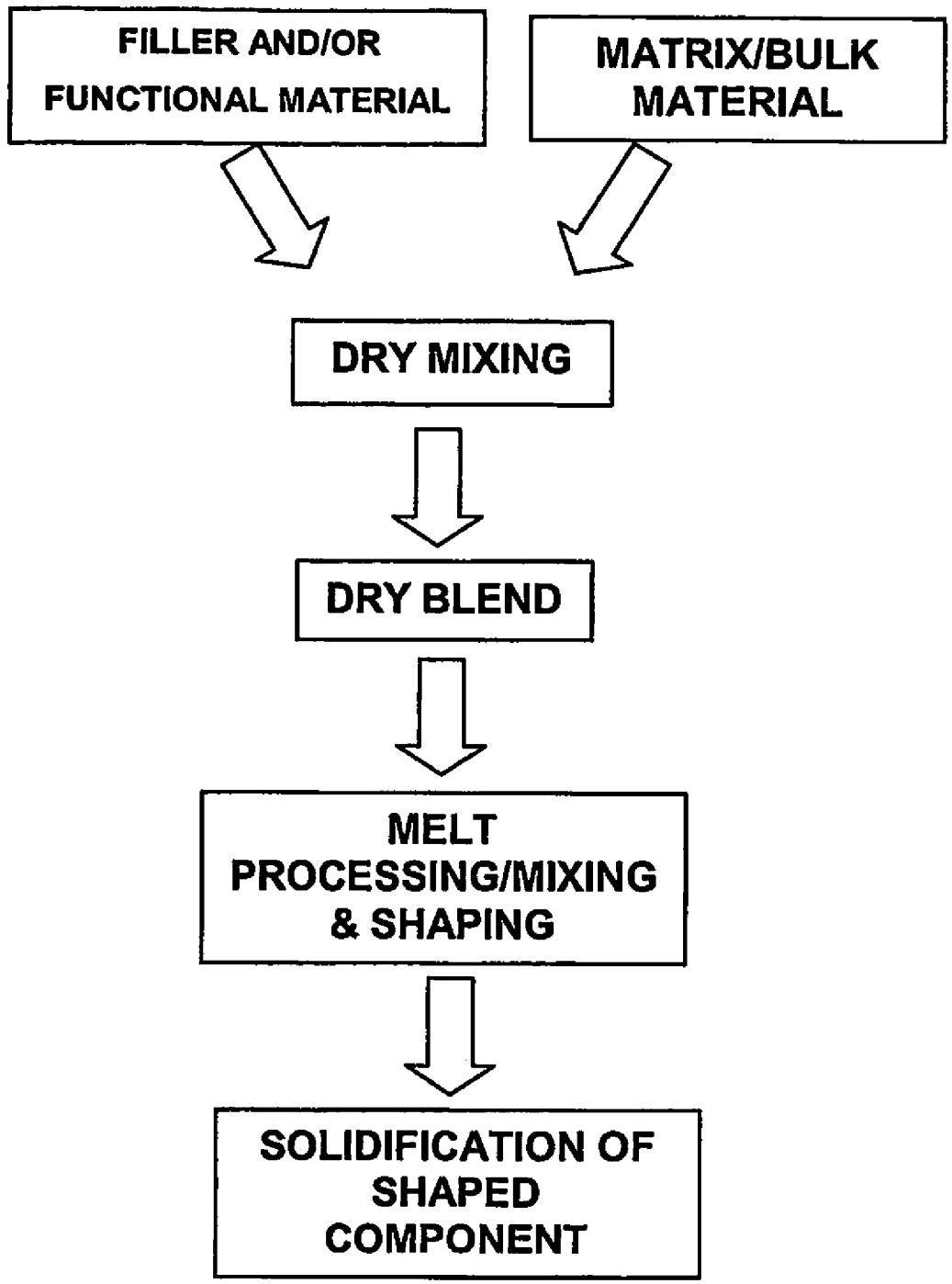
FIG. 1 is a flow diagram of a prior art process for incorporating a filler into a bulk material.
Figure 2:
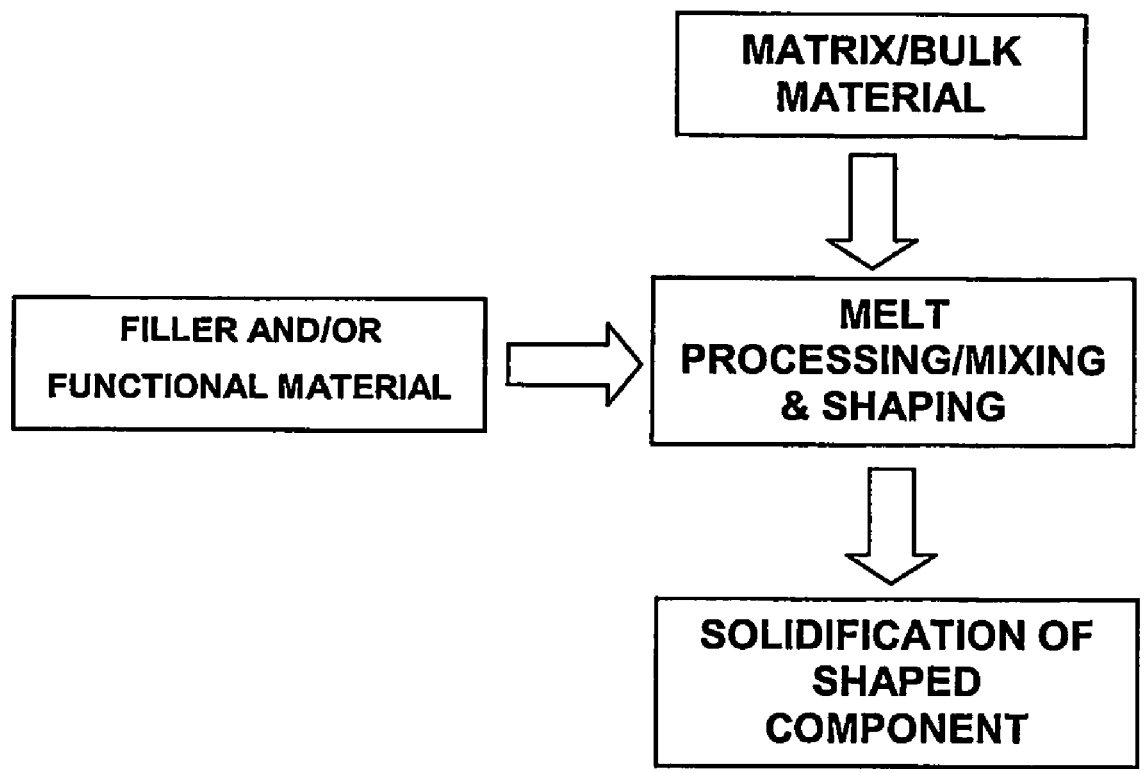
FIG. 2 is a flow diagram of an alternative prior art process for incorporating a filler into a bulk material.
Figure 3:
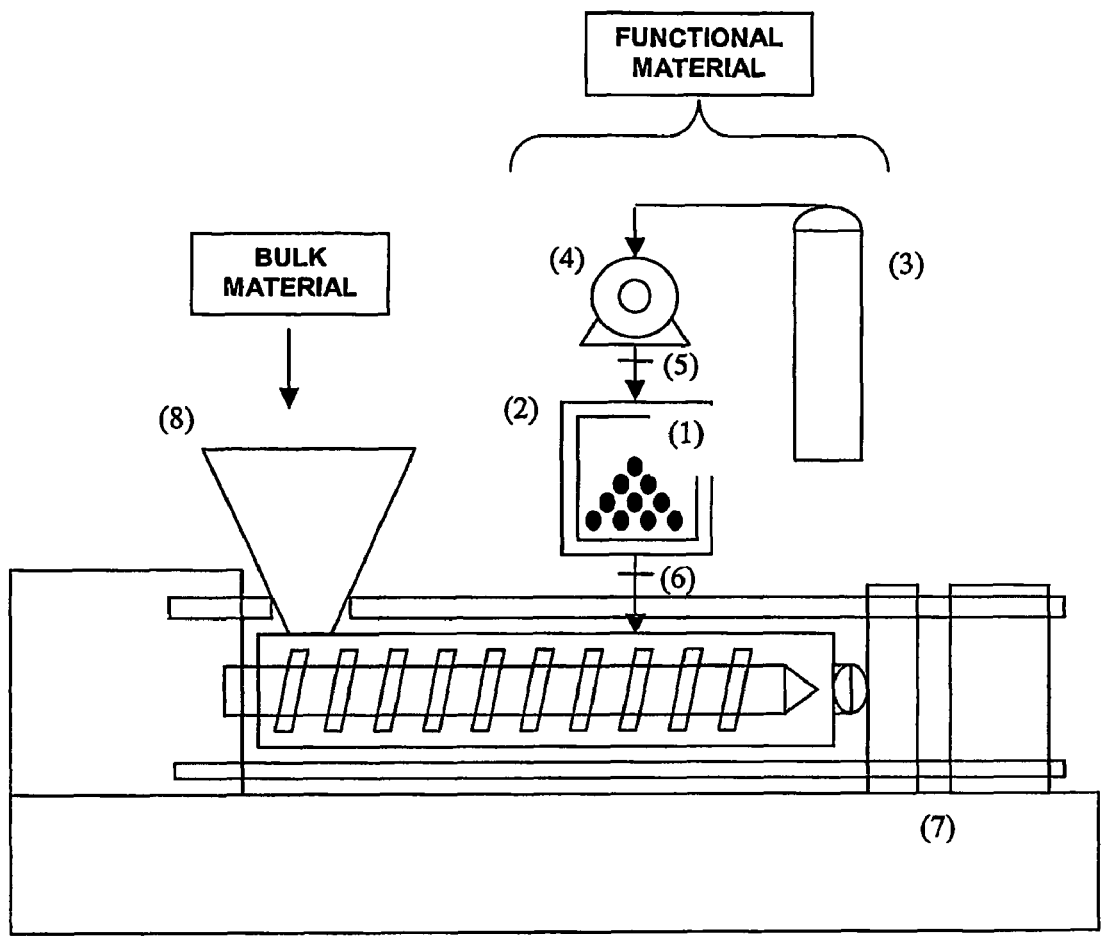
FIG. 3 shows one embodiment of system in accordance with the invention for incorporating into a bulk material one or more functional materials.

FIG. 3 outlines one possible embodiment of the invention. The functional material (1) is placed in a vessel containing sight glasses where the pressure and temperature can be controlled (2). The fluid (3) is fed to a pump capable of achieving high pressures (4). In this embodiment, the pump used is an ISCO 260D syringe pump (obtainable from ISCO Inc., Nebraska, USA). Under the correct operating conditions of pressure and temperature the fluid reaches its supercritical or near supercritical state. This fluid is injected into the pressure vessel (2) using an electronically actuated valve (5).

Using carbon dioxide as an example under the correct operating conditions of pressure and temperature the fluid reaches its supercritical or near supercritical state dissolving the functional material (850 to 5000 psi and from 30° C.). Some functional materials might require the addition of entrainers, co-solvents, ligands, and other binding agents such as enzymes and receptors depending on the solubility of the functional material in the supercritical fluid.

This functional solution is then injected into polymer melt processing equipment using an electronically controlled specially designed one-way valve (6). Injection can be assisted using a second pump. Whilst the functional solution is being injected into the polymer melt processing equipment (7), the bulk material is fed via the hopper (8).

As the bulk material is fed downstream the material is heated and sheared so that when the functional solution is fed into the machine the majority of the bulk material is in its melt state. When the functional material is injected into the bulk material a single-phase solution is formed. The formation of this solution could be aided by mixing sections in the machine. The functional fluid can be injected in any position in the machine for example, via a hopper (using a pressurised and sealed hopper), in the heated barrel which contains the rotating screw(s), in the die section in the case of extrusion based equipment, in the nozzle section that feeds the mould in the case of injection moulding based equipment and in the runner sections in the mould.

In all cases the majority of the bulk material has to be in its melt state and mechanical mixing or sufficient turbulence is introduced to allow the formation of a single-phase functional solution.

Figure 4:
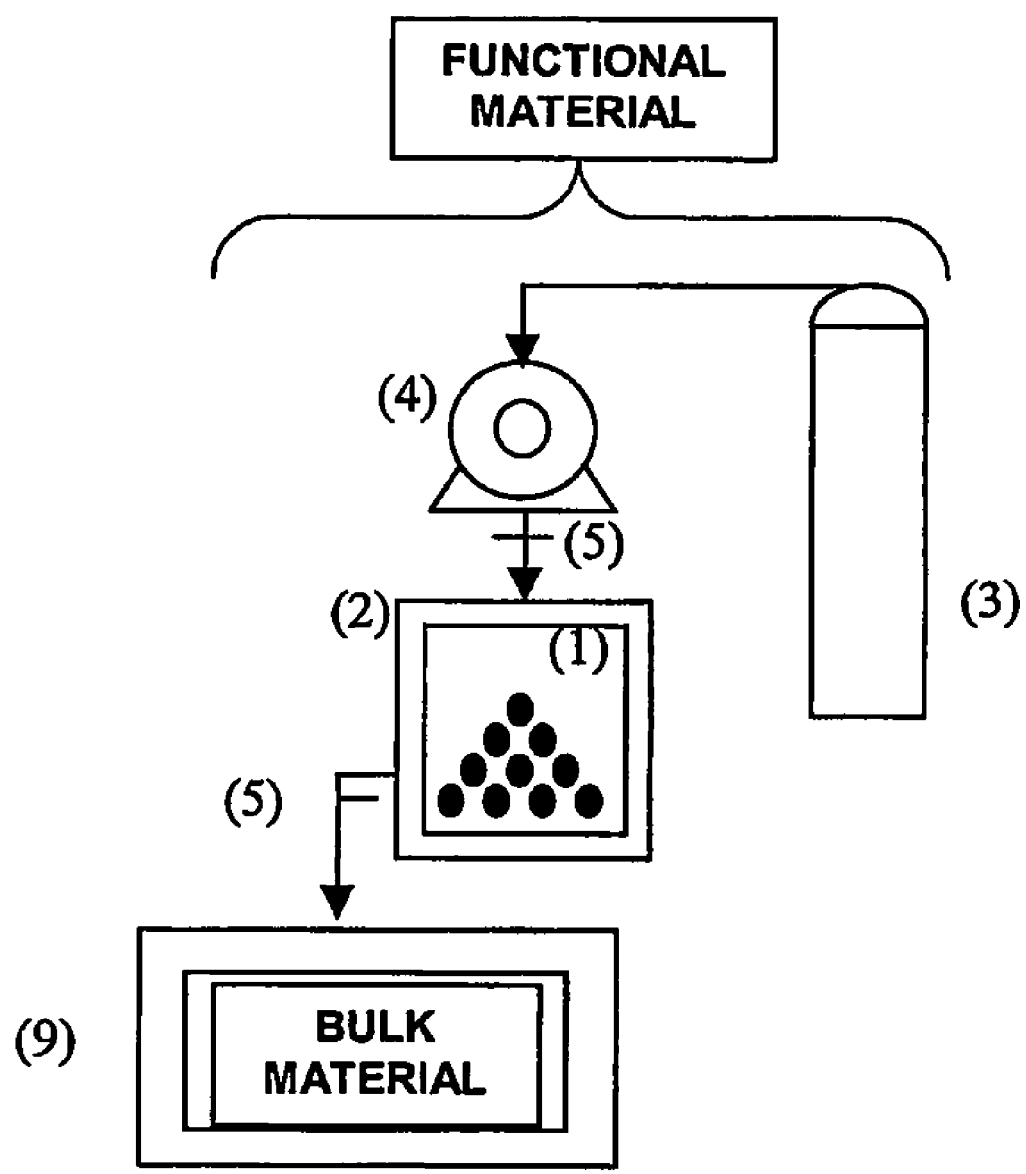
FIG. 4 shows another embodiment of system in accordance with the invention for incorporating into a bulk material one or more functional materials.

Another possible embodiment of this invention is outlined in FIG. 4. The functional material (1) is placed in a vessel containing sight glasses where the pressure and temperature can be controlled (2). The fluid (3) is fed to a pump capable of achieving high pressures (4). The pump used in this embodiment is an ISCO 260D syringe pump (ISCO Inc., Nebraska, USA). Under the correct operating conditions of pressure and temperature the fluid reaches its supercritical or near supercritical state, this fluid is injected into the pressure vessel (2) using an electronically actuated valve (5). Using carbon dioxide as an example under the correct operating conditions of pressure and temperature the fluid reaches its supercritical or near supercritical state dissolving the functional material (850 to 5000 psi and from 30° C.). Some functional materials might require the addition of entrainers, co-solvents, ligands, and other binding agents such as enzymes and receptors depending on the solubility of the functional material in the supercritical fluid. This functional solution is then injected into a pressure chamber (9) for semi-solid impregnation.

The functional material is soluble in a near supercritical or supercritical fluid, which dissolves in the matrix material. Alternation of the processing conditions facilitates a change of state for the fluid, which results in the precipitation of the functional material in the bulk material. This method allows the shaping of the impregnated bulk material using conventional polymer based processing techniques such as extrusion and injection moulding.

In some embodiments the functional material could aid the removal of certain unwanted materials after bulk processing. For example a material formulation might be used to facilitate shaping of components but is not required after shaping or it could be detrimental to the success of additional processing steps that are required. In another example the removal of a material after processing would enhance the formation of an open porous or interconnected network. The functional material could also aid the removal of unwanted materials that are used to enhance processing or are present as a result of processing (processing by-products), without such removal overall properties of the finished product could be affected. In all cases this type of functional material will increase the efficiency of extraction.

A number of Examples will now be described.

EXAMPLE 1

The Incorporation/Impregnation of Vitamins into Bulk Materials

Liposoluble vitamins such as vitamin A, D and E can be impregnated into bulk materials such as food, body lotions, creams and cosmetics. In this example vitamin E ($\alpha$-Tocopherol acetate, Sigma-Aldrich, Dorset, UK), i.e. the functional material was placed in a SS316 vessel capable of withstanding high pressures (300B vessel, SCF Processing Ltd, Ireland) and methanol (99% purity, BDH, Poole, England) was added before the vessel was sealed. Liquid $CO_2$ (BOC, Dublin, Ireland) was injected into the vessel and the vessel was pressurised to 5,000 psi 80° C. using an Isco 260D syringe pump. When the vitamin E dissolved in the $CO_2$/methanol, 2 wt % of this functional solution was injected into a twin-screw at 80° C. and 2,000 psi extruder containing water, stearic acid, cetyl alcohol, potassium chloride and extruded at 90° C. The pressure was reduced to atmospheric pressure on exiting the die, the methanol and $CO_2$ were vented.

Modification: A

The vitamin E and methanol were placed in a container overnight prior to pressurisation.

Modification: B

The functional solution was prepared as outlined in Example 1 and then injected into a second vessel containing water, stearic acid, cetyl alcohol and potassium chloride. This vessel was pressurised and heated to 80° C. and the contents of the vessel were mixed using a high-pressure mechanical mixing attachment. A single-phase solution was formed and mixing continued for 20 mins. The pressure was reduced gradually to atmospheric pressure, the methanol and $CO_2$ were vented and the contents of the vessel were removed.

Modification: C 14 ml of Methanol was placed in the syringe pump & the 266 ml capacity pump was filled with liquid $CO_2$. The pump was pressurised to 5,000 psi at 80° C. and this solution was then injected into the vessel containing the vitamin E. The vessel was pressurised to 5,000 psi at 80° C. and the solution was mixed. The solution was then transferred to a second vessel containing the water, stearic acid, cetyl alcohol, potassium chloride, as outlined in example 1 Modification B.

EXAMPLE 2

Fullerenes Impregnated into Polystyrene

Buckminsterfullerene powder ($C_{60}$) (BDH, Poole, England), i.e. the functional material was placed into a pressure vessel (300B vessel, SCF Processing Ltd, Ireland). Toluene (>99% purity, Romil Ltd. Cambridge, England) was also placed in the vessel. Liquid $CO_2$ was injected into the vessel and the vessel was pressurised to 3,000 psi at 50° C. using an Isco 260D syringe pump. When the fullerene powder dissolved in the $CO_2$/toluene, 2 wt % of the functional solution was injected at 2,500 psi and 150° C. into a twin screw extruder that was melt processing polystyrene. The fullerene/toluene/$CO_2$ solution dissolved into the molten polymer and a single-phase solution was formed. By altering the pressure in the extruder and/or by exiting the die the $CO_2$/toluene was vented off leaving the fallerene, the functional material impregnated in the polystyrene.

Modification: A

As Example 2 but the fullerene and toluene were placed in a container overnight prior to pressurisation and treatment.

Modification: B

The functional solution was pumped into a second pressure vessel that contained polystyrene powder (Ashland, Alfreton, England) and mixed at 150° C. at 2,500 psi using a high-pressure mechanical mixing attachment. Mixing continued for 20 mins once a single-phase solution was formed. The pressure was reduced gradually to atmospheric pressure by venting. When the vessel cooled sufficiently the polystyrene impregnated with fullerene was removed.

EXAMPLE 3

Impregnating Copper into Polymers

Copper powder (Lab Pak Ltd, Fillongley, UK), i.e. the functional material was placed in a vessel capable of withstanding high pressures (300B vessel, SCF Processing Ltd, Ireland) and acetylacetone (chelating agent) was added before the vessel was sealed. Liquid $CO_2$ was injected into the vessel and the vessel was pressurised to 2500 psi at 150° C. using an Isco 260D syringe pump. When the powder dissolved in the COacetylacetone, 2 wt % of the functional solution was injected at 150° C. and 2500 psi into an injection moulding machine that was melt processing polystyrene. The functional solution dissolved in the polymer melt and after sufficient mixing a single phase solution was formed. A standard injection moulding operation was performed after this.

EXAMPLE 4

Drying of Wood Fibres Prior to Melt Processing of Polymer/Wood Composites

If moisture is present in wood fibres/flour problems are encountered during melt processing (eg extrusion, injection moulding) of wood/polymer composites.

Wood fibres were placed in the 300B vessel and the vessel was sealed. Methanol was injected into the vessel at room temperature and 300 psi using an Isco 260 D syringe pump. The vessel remained pressurised for 60mins prior to venting. This technique was repeated four more times. When the vessel was vented for the fourth time methanol at room temperature was injected until the methanol covered the wood fibres and this was left overnight. The wood fibres were then removed and the excess methanol was dried off with a tissue. The fibres were then returned to the pressure vessel, $CO_2$ at 35° C. and 2,000 psi was injected into the vessel. After 60mins of treatment the $CO_2$ was vented off and the $CO_2$ treatment was repeated. The dried wood fibres were removed from the vessel. At this stage in the process the wood moisture free wood fibres could be sealed in a bag and stored prior to use. Alternatively the fibres can be directly fed into a twin screw extruder and compounded with a polymer melt such as polypropylene or polystyrene.

In this example methanol the functional material replaces moisture in the wood fibres and the $CO_2$ dissolves the methanol.

The invention claimed is:

1. A method for combining a first material and a second material, comprising the steps of:
   (a) providing a first material, the first material being a functional material able to alter property of or impart a property to a second material;
   (b) providing a fluid which is near or in the supercritical fluid state,
   (c) at least partially dissolving the first functional material in the fluid,
   (d) providing a second material, the second material being a bulk, matrix material;
   (e) only subsequently incorporating the solution of the first functional material and the fluid into the bulk material to form a single phase solution from the first functional material, the bulk material and said fluid, and
   (f) removing said fluid from said solution in order to leave the combined first functional and bulk materials, thereby resulting in a material having the altered or imparted property of the functional material.

2. A method as claimed in claim 1, wherein the second material is provided in a semi-solid or molten state.

3. A method as claimed in claim 1, wherein the fluid is removed from said solution by reducing the pressure in order to vent the fluid to atmosphere as a gas.

4. A method as claimed in claim 1, wherein the fluid is removed from said solution by suction.

5. A method as claimed in claim 1, wherein the fluid is carbon dioxide, water, nitrogen or any combination thereof.

6. A method as claimed in claim 1, wherein the material of step (f) is processed in order to produce a final product.

7. A method as claimed in claim 6, wherein the processing is extrusion, injection moulding, rotational moulding, blow moulding, vacuum molding or thermoforming.

8. A method as claimed in claim 1, wherein the first material comprises a mineral, a vitamin, a fullerene, a metal, a non-metal, a herb, a naturally occurring material, caffeine, an organic material, a plastics material, a monomer, an oligomer, a polymer, or any combination thereof.

9. A method as claimed in claim 1, wherein a co-solvent is added to said fluid either before, after or during the formation of said single phase solution.

10. A method as claim in claim 9, wherein the proportion of co-solvent to said fluid is about 1:20.

11. A method as claimed in claim 9, wherein the co-solvent comprises methanol, ethanol, propanol, butyl alcohol, propylene carbonate, toluene, pentane, acetylacetone, octane, acetone or any combination thereof.

12. A method as claimed in claim 1, wherein the second material comprises a polymer, a ceramic, a metal or wood.

13. A method as claimed in claim 1, wherein the method is a continuous process.

14. A method as claimed in claim 1, wherein the method is a polymer melt processing technique and wherein the second material is provided in a semi-solid or molten state.

15. A method as claimed in claim 14, wherein the polymer melt processing technique is injection moulding, extrusion, blow moulding, vacuum forming, thermoforming, or rotational moulding.

16. A method as claimed in claim 15, wherein the technique is extrusion or injection moulding.

17. A method as claimed in claim 1, wherein the second material is not swollen by the fluid.

18. A method of combining a functional material and a bulk, matrix material during a polymer melt processing technique, wherein the functional material alters a property of or imparts a property to the bulk material, comprising the steps of:
 (a) providing a fluid which is near or in the supercritical fluid state;
 (b) at least partially dissolving the functional material in the fluid;
 (c) introducing the functional fluid into polymer melt processing equipment;
 (d) separately introducing the bulk material into polymer melt processing equipment, the bulk material being in semisolid or molten state;
 (e) incorporating the functional fluid into the bulk material within the polymer melt processing equipment to form a single phase solution from the functional material, the bulk material and the fluid, and
 (f) removing said fluid from said solution in order to leave the combined functional and bulk materials.

* * * * *